United States Patent
Zhang et al.

(10) Patent No.: US 8,634,842 B2
(45) Date of Patent: Jan. 21, 2014

(54) RADIO RESOURCE ALLOCATION IN SYSTEMS COMPRISING RELAYS

(75) Inventors: Zhang Zhang, Xi Ba He (CN); Yin Liu, Chaoyang District (CN); Jiansong Gan, Qinghe (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/521,192

(22) PCT Filed: Jan. 15, 2010

(86) PCT No.: PCT/CN2010/000067
§ 371 (c)(1),
(2), (4) Date: Jul. 9, 2012

(87) PCT Pub. No.: WO2011/085519
PCT Pub. Date: Jul. 21, 2011

(65) Prior Publication Data
US 2013/0090121 A1    Apr. 11, 2013

(51) Int. Cl.
*H04W 72/00* (2009.01)
(52) U.S. Cl.
USPC ............. 455/450; 455/16; 455/453; 455/464; 455/509; 370/315; 370/328; 370/329; 370/338; 370/431
(58) Field of Classification Search
USPC .............. 370/310.2, 315, 328, 329, 338, 431, 370/432; 455/16, 450, 453, 464, 509
See application file for complete search history.

(56) References Cited

U.S. PATENT DOCUMENTS

| 2003/0154112 A1* | 8/2003 | Neiman et al. ................ 705/5 |
| 2009/0163220 A1 | 6/2009 | Liu et al. |
| 2009/0196177 A1* | 8/2009 | Teyeb et al. ................ 370/231 |
| 2012/0218886 A1* | 8/2012 | Van Phan et al. ............ 370/229 |

FOREIGN PATENT DOCUMENTS

| CN | 101505482 A | 8/2009 |
| CN | 101572654 A | 11/2009 |

OTHER PUBLICATIONS

Kaneko, et al. Throughput-Guaranteed Resource-Allocation Algorithms for Relay-Aided Cellular OFDMA System, IEEE Transactions on Vehicular Technology; vol. 58 No. 4 May 2009.

* cited by examiner

*Primary Examiner* — Wesley Kim
*Assistant Examiner* — Dinh P Nguyen

(57) ABSTRACT

A method of allocating radio resources to communication links of a wireless communication system based on status parameters of each of the links, the communication system having a plurality of network nodes, a plurality of relays associated with the network nodes, and a terminal accessing the communication system. A first radio resource allocation may be determined by balancing the performance of a relay-to-network-node communication link of each relay against the performance of a corresponding terminal-to-relay communication link. A second allocation may be determined by balancing the performance of the relay-to-network-node communication link of each relay against the performance of a terminal-to-network-node communication link. A final allocation may be determined by calculating a weighted average value of the first and second allocations.

13 Claims, 4 Drawing Sheets

RADIO RESOURCE ALLOCATION IN SYSTEMS COMPRISING RELAYS

TECHNICAL FIELD

The present invention relates generally to the field of wireless communication systems comprising at least one network node and at least one relay associated with the network node. More particularly, it relates to allocation of radio resources in such systems.

BACKGROUND

Some wireless communication systems (in particular many highly evolved communication systems) apply relaying functionality. One example of such a system is a system that operates according to LTE-Advanced (Long Term Evolution Advanced) advocated by 3GPP ($3^{rd}$ Generation Partnership Project) and targeting to meet the requirements of the International Telecommunications Union (ITU) for next generation mobile systems (IMT-Advanced). Relaying functionality have been discussed (among other technology components for such systems) in 3GPP, RP-080236, REV-080060, Report of 3GPP TSG RAN IMT Advanced Workshop, Shenzhen, China, Apr. 7-8, 2008, and in Ericsson, R1-082024, "A discussion on some technology components for LTE-Advanced", contribution to TSG-RAN WG1 #53.

There exists a plethora of options for relaying functionality, e.g.

Layer 1 relay (repeater) as described in Ericsson, R1-082470, "Self backhauling and lower layer relaying", contribution to TSG-RAN WG1 #53 bis, Type one relay as described in the 3GPP standard, and Type two relay as described in Vodafone, CMCC, Huawei, Ericsson, et al, R1-091632, "Type II relay frame-work definition", contribution to TSG-RAN WG1 #56bis.

FIG. 1 is a schematic drawing illustrating part of an example network setup employing relays. A base station site 110 comprises a base station 111 associated with a so called donor cell 115. The base station 111 may be any applicable base station, for example an eNodeB (evolved NodeB). The base station 111 may be connected to a network controller 140 and to the rest of the example network. The donor cell 115 is serving or camping cell for the terminals 112, 113, 114. Communication between the base station 111 and the terminals 112, 113, 114 takes place over the base station access link represented by arrows 119 (downlink, DL, and uplink, UL).

The base station 111 of the donor cell 115 is associated with two relay sites 120 and 130, each comprising a relay 121 and 131 respectively.

The relay 121 may be any applicable relay, for example a type one relay. The relay 121 is associated with a cell 125. The cell 125 is serving or camping cell for the terminals 122, 123. Communication between the relay 121 and the terminals 122, 123 takes place over the relay access link represented by arrows 128 (downlink, DL, and uplink, UL), while communication between the relay 121 and the base station 111 takes place over the relay backhaul link represented by arrows 129 (downlink, DL, and uplink, UL).

The relay 131 may be any applicable relay, for example a type one relay. The relay 131 is associated with three cells 135, 136, 137. The cell 137 is serving or camping cell for the terminal 132. Communication between the relay 131 and the terminal 132 takes place over a relay access link (not shown), while communication between the relay 131 and the base station 111 takes place over a relay backhaul link (not shown).

Relaying is considered for LTE-Advanced as a tool to improve e.g. the coverage of high data rates, group mobility, temporary network deployment, the cell-edge throughput, and/or to provide coverage in new areas. At least the type one relay node functionality is a part of LTE-Advanced.

A type one relay node may control one or several cells, each of which has a unique physical-layer cell identity and appears to a terminal as a separate cell, distinct from the donor cell. The same RRM (Radio Resource Management) mechanisms are available at both the eNodeB and the type one relay. Typically, cells controlled by a type one relay may have the additional requirement that they should be able to support also LTE Rel-8 terminals.

A relay node is typically wirelessly connected to the radio access network via a donor cell as described in connection to FIG. 1. The radio link between the base station (eNodeB) of the donor cell and the relay node is termed the relay backhaul link. The radio link between the relay node and a terminal associated with the relay node is termed the relay access link.

The connection of a terminal to the radio access network (via a relay node) can be either in-band or out-band depending on, for example, the applied communication standard and other parameters and/or conditions as specified by a communication standard or an operator of the network.

In the case of in-band relaying, the relay backhaul link operates in the same frequency spectrum as the relay access link. Thus, if no measures are taken, there is a risk that there will be severe output-to-input interference at the relay node if the relay transmits and receives simultaneously. One solution to this obstacle is to time multiplex the relay backhaul link and the relay access link. One implementation of this solution comprises introducing one or more "backhaul" sub-flumes dedicated for relay backhaul transmission.

In LTE-Advanced such an implementation may include scheduling relay access uplink transmissions and relay backhaul uplink transmissions in different sub-frames. Furthermore, MBSFN (Multimedia Broadcast over a Single Frequency Network) sub-frames may be used to facilitate relay backhaul downlink transmissions in LTE-Advanced. In that case, the performance of relay backhaul downlink transmissions can be guaranteed by not allowing any relay access downlink transmissions except in a few OFDM symbols (e.g. the first one or two OFDM symbols where control signalling is transmitted). The set of relay backhaul uplink and/or downlink sub-frames (i.e. sub-frames during which relay backhaul transmissions may occur) may be semi-statically assigned.

FIG. 2 illustrates a situation where MBSFN sub-frames 210, 220 are used for downlink transmissions in relation to a relay node. Each of the sub-frames 210, 220 comprises a control part 211, 221 and a data part 212, 222. The sub-frame 210 may be used for relay access downlink transmissions in a conventional manner, while the sub-frame 220 may be used for relay backhaul downlink transmissions. Relay access downlink transmissions may be allowed in sub-frame 220, but only in the first part 221 of sub-frame 220. Thus, in this case there are no relay access downlink transmissions in the time interval 223, and relay backhaul downlink transmissions may be received without output-to-input interference at the relay node.

The relay backhaul links (each associated with a respective relay node) and the base station (e.g. eNodeB) access link may be time multiplexed or frequency multiplexed with respect to each other.

As mentioned above, relaying may be introduced to a system to improve e.g. the coverage of high data rates, group mobility, temporary network deployment, the cell-edge throughput, and/or to provide coverage in new areas. These objectives can only be achieved with adequate radio resource allocation to the various links.

The issue of radio resource allocation in relaying systems have been discussed in Dai Qin-yun, Rong Lu, Hu Hong-lin, Su Gang, "Resource allocation using time division multiple access over wireless relay networks", The Journal of China Universities of Posts and Telecommunications, 2008, 15(3), in Kaneko M., Popovski P., Hayashi K., "Throughput-Guaranteed Resource-Allocation Algorithms for Relay-Aided Cellular OFDMA System," VTC, May 2009, and in US 2009/0163220 A1 (Chin Ngo, Yong Liu, "Method and system for resource allocation in relay enhanced cellular systems").

In a system with relay functionality it is a difficult task to adequately optimize allocation of radio resources to each of the relay access links, each of the relay backhaul links and the base station access link.

There is a need for alternative (and preferably improved) methods and arrangements for radio resource allocation of wireless communication systems comprising at least one network node and at least one relay associated with the network node.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide alternative methods and arrangements for radio resource allocation of wireless communication systems comprising at least one network node and at least one relay associated with the network node.

According to a first aspect of the invention, this is achieved by a method of allocating radio resources of a wireless communication system comprising at least one network node and at least one relay associated with the network node. The method comprises allocating radio resources to at least one of a terminal-to-network-node link, a terminal-to-relay link of each of the at least one relays, and a relay-to-network-node link of each of the at least one relays. The allocation is based on status parameters of each of: the terminal-to-network-node link, the terminal-to-relay link of each of the at least one relays, and the relay-to-network-node link of each of the at least one relays.

In some embodiments, the method may comprise determining a first radio resource allocation by balancing a performance of the relay-to-network-node communication link of each of the at least one relays to a performance of the corresponding terminal-to-relay communication link, and determining a second radio resource allocation by balancing a performance of the relay-to-network-node communication link of each of the at least one relays to a performance of the terminal-to-network-node communication link. The method may also comprise calculating a weighted average value of the first and second radio resource allocation and allocating radio resources in accordance with the corresponding calculated weighted average. The performance may be defined as an amount of data per time and frequency unit.

In some embodiments, the radio resources of a relay-to-network-node communication link may comprise time-frequency blocks having a corresponding time-frequency block size for each of the at least one relays. The method may comprise receiving at least one status indication comprising the corresponding status parameters from each of the at least one relay, wherein the corresponding status parameters comprise at least information regarding a number of terminals served by the corresponding relay, information regarding a throughput of the corresponding terminal-to-relay communication link, information regarding at least one of a traffic type and a quality of service requirement of the terminals served by the corresponding relay, and information regarding a spectrum efficiency of the corresponding relay-to-network-node communication link. The method may further comprise determining (for each of the at least one relays) a first time-frequency block size based at least on the information regarding the throughput of the corresponding terminal-to-relay communication link and the spectrum efficiency of the corresponding relay-to-network-node communication link, and determining (for each of the at least one relays) a second time-frequency block size based at least on the number of terminals served by each of the at least one relays, a number of terminals served by the network node, the spectrum efficiency of the relay-to-network-node communication link of each of the at least one relays, and a spectrum efficiency of a terminal-to-network-node communication link. In such embodiments, the method may further comprise calculating a weighted average value of the first and second time-frequency block sizes for each of the at least one relays based at least on the information regarding at least one of the traffic type and the quality of service requirement of the terminals served by each of the at least one relays, allocating radio resources to the relay-to-network-node communication link of each of the at least one relays in accordance with the corresponding calculated weighted average values, and transmitting an indication of the corresponding allocated radio resources to each of the at least one relays.

According to some embodiments the method may further comprise receiving a status indication from the network node, wherein the status indication comprises at least information regarding the number of terminals served by the network node, and information regarding the spectrum efficiency of the terminal-to-network-node communication link.

The step of calculating weighted average values may comprise minimizing the time-frequency block size for a particular relay-to-network-node communication link if the average spectrum efficiency of the particular relay-to-network-node communication link is less than the average spectrum efficiency of the terminal-to-network-node communication link and maximizing the time-frequency block size for the particular relay-to-network-node communication link otherwise.

The wireless communication system may operate in compliance with the telecommunication standard E-UTRAN (Evolved Universal Terrestrial Radio Access Network), the network node may be an eNodeB, and the at least one relays may be type one relays.

A second aspect of the invention is a computer program product comprising a computer readable medium, having thereon a computer program comprising program instructions, the computer program being loadable into a data-processing unit of a wireless communication system, the wireless communication system comprising at least one network node and at least one relay associated with the network node and adapted to cause the data-processing unit to allocate radio resources by performing the method according to the first aspect of the invention when the computer program is run by the data-processing unit.

According to a third aspect of the invention, an arrangement for allocating radio resources of a wireless communication system, wherein the wireless communication system comprises at least one network node and at least one relay associated with the network node, comprises a processor adapted to determine a radio resource allocation based on status parameters of each of a terminal-to-network-node link, a terminal-to-relay link of each of the at least one relays, and a relay-to-network-node link of each of the at least one relays. The arrangement also comprises an allocator adapted apply the determined radio resource allocation to at least one of the terminal-to-network-node link, the terminal-to-relay link of each of the at least one relays, and the relay-to-network-node link of each of the at least one relays.

In some embodiments, the arrangement may further comprise a receiver adapted to receive at least one status indication comprising the corresponding status parameters from each of the at least one relays, wherein the corresponding status parameters comprise at least information regarding the number of terminals served by the corresponding relay, information regarding the throughput of the corresponding terminal-to-relay-to communication link, information regarding at least one of a traffic type and a quality of service requirement of the terminals served by the corresponding relay, and information regarding the spectrum efficiency of the corresponding relay-to-network-node communication link. The arrangement may also comprise a transmitter adapted to transmit an indication of the corresponding allocated radio resources to each of the at least one relays.

A fourth aspect of the invention is a scheduler comprising the arrangement according the third aspect of the invention.

In some embodiments, the third and fourth aspects of the invention may additionally have features identical with or corresponding to any of the various features as explained above for the first aspect of the invention.

An advantage of some embodiments of the invention is that a more efficient exploitation of the benefits of the relaying functionality is provided.

Another advantage of some embodiments of the invention is improved system throughput.

Another advantage of some embodiments of the invention is that the performance experienced by different users may be better balanced.

Another advantage of some embodiments of the invention is that backward compatibility is possible.

Another advantage of some embodiments of the invention is that there is no need for increases terminal complexity.

Another advantage of some embodiments of the invention is that simple implementation is possible,

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

Figure 1:
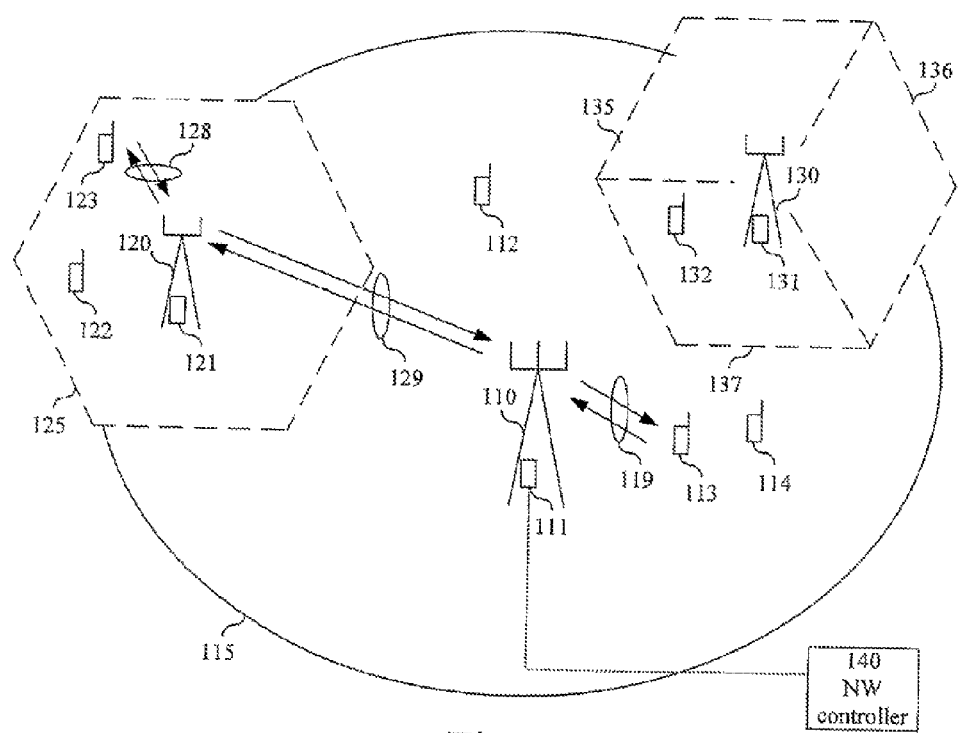
FIG. 1 is a schematic drawing illustrating an example setup of a network comprising relays.
Figure 2:
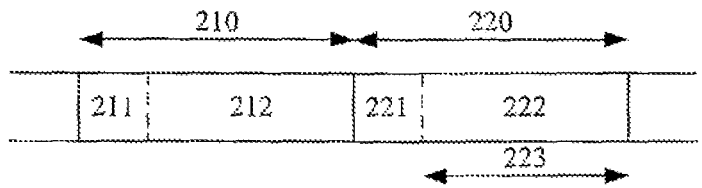
FIG. 2 is a schematic drawing illustrating various transmission intervals in relation to relay node functionality.

Some of the general examples given above were described using terminology associated with LTE-Advanced. Likewise, embodiments of the invention will, in the following, be described using LTE-Advanced terminology. However, it should be understood that these examples and embodiments are merely for illustrative purposes and by no means limiting to the invention. Contrarily, embodiments of the invention are equally applicable to any communication system including relaying functionality.

One important issue for managing a system with one or more relays is how much of the available radio resources should be allocated to each relay backhaul link. In this context there are several aspects to consider.

For example, it may be desirable to match the performance of each relay backhaul link with the performance of the corresponding relay access link. This is due to the fact that the relay user performance (the performance experienced by a user of a terminal served by the relay) is limited by both the relay backhaul link and the relay access link. This if one of the relay backhaul link and the relay access link has poor performance, the relay user performance will also be poor.

Another aspect to consider is that it may be desirable to maximize the capacity benefit (e.g. total throughput) achievable from application of relay functionality.

A further aspect to consider in this context is that it may be preferable that the relay user performance (the performance experienced by a user of a terminal served by the relay) and the base station user performance the performance experienced by a user of a terminal served directly by the base station of the donor cell) are the same or at least similar.

According to some embodiments of the invention two or more of these aspects arc considered jointly in the resource allocation.

In the following, embodiments of the invention will be described where radio resources are allocated to at least one of:
the terminal-to-network-node (base station access) link,
the terminal-to-relay (relay access) link of each relay under consideration, and
the relay-to-network-node (relay backhaul) link of each relay under consideration,
based on status parameters of each of the links. For example, resources may be allocated to a particular relay backhaul link based on status parameters of the base station access link, of each of the relay backhaul links, and of the corresponding particular relay access link.

As mentioned above, a relay backhaul link and its corresponding relay access link may typically be time multiplexed to avoid severe output-to-input interference. Thus, according to some embodiments, a relay backhaul link may be transmitted in relay backhaul sub-frames and a corresponding relay access link may be transmitted in relay access sub-frames.

Furthermore, according to embodiments of the invention, the relay backhaul links and the base station access link may be multiplexed with respect to each other in time, in frequency or in both time end frequency.

Thus, in each of the relay backhaul sub-frames, the relay backhaul links of different relays may be time multiplexed (e.g. in that different relay backhaul links are allocated to different relay backhaul sub-frames) or frequency multiplexed (e.g. in that different relay backhaul links are allocated to the same relay backhaul sub-frame bat in different frequency bands). In some embodiments, the relay backhaul links of different relays may be multiplexed in both time and frequency.

Furthermore, the eNodeB access link may, according to some embodiments, be time and/or frequency multiplexed with the relay backhaul links of the different relays in relay backhaul sub-frames.

In relay access sub-frames, the eNodeB access link and the relay access links can share the same radio resources. In the following description of embodiments, frequency reuse one is assumed (i.e. the eNodeB access link and the relay access links may use the whole available bandwidth in relay access sub-frames). It is noted, however, that embodiments of the invention are equally applicable to situations where frequency reuse is not (or not fully) adopted. Furthermore, the eNodeB access link may, in some embodiments, use any vacant resource (i.e. any resource that is not used by either relay backhaul link or relay access link).

According to some embodiments of the invention, a hypothetical allocation of radio resources to a relay backhaul link is determined based on an allocation of radio resources to the corresponding relay access link and/or based on a total radio resource allocation to the relay access link and the relay backhaul link. Then, an optimization criterion may be used to determine an optimized radio resource allocation from the hypothetical allocation. An example optimization criterion might involve optimizing a total throughput of the donor cell, balancing experienced user performance of relay users and base station users, and/or balancing resources of the relay access and backhaul links.

Figure 3:
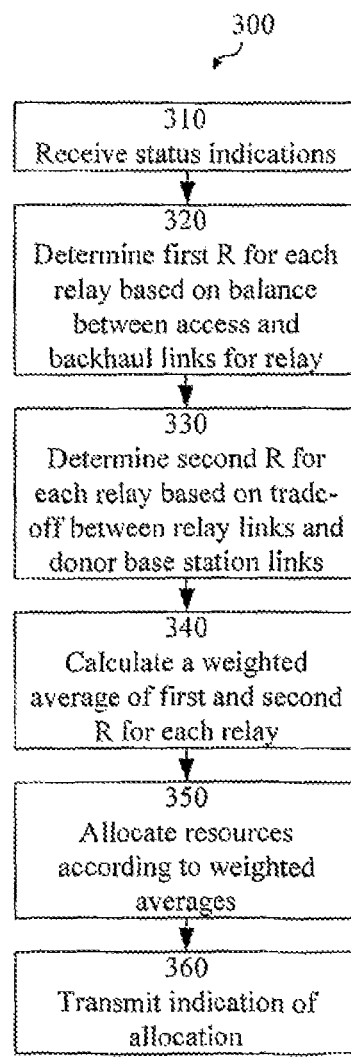
FIG. 3 is a flowchart illustrating example method steps according to some embodiments of the invention.

FIG. 3 is a flowchart illustrating an example method 300 according to some embodiments of the invention. This example method starts in step 310, where indications regarding the respective status of each of the links are received. The status indications may include information regarding various status parameters such as, for example, throughput of the link, spectrum efficiency of the link, and the number of users served by the link.

In step 320, a first resource allocation is determined for a particular relay backhaul link based at least on parameters of the particular relay backhaul link and the corresponding relay access link. The determination may aim at a balance of performance (e.g. in terms of throughput) between the particular relay backhaul link and the corresponding relay access link. If there are several relays associated with the donor cell, step 320 is performed for each of the relays. Furthermore, if there are several relays associated with the donor cell, parameters of other relay backhaul links and other relay access links may also be used in the determination of the first resource allocation for the particular relay.

In step 330, a second resource allocation is determined for each relay backhaul link based at least on parameters of the base station access link and either of the relay backhaul links and the relay access links (preferably, the one representing a bottle neck in terms of performance). The determination may aim at a balance of performance (e.g. in terms of throughput) among users served by each of the relays and users served by the base station.

A weighted average value of the first and second resource allocation is determined in step 340 for each of the relays. The weights assigned to each of the first and second resource allocation may be the same for all relays or may differ between different relays. The weights may be based on a compromise (trade off) between the system throughput and a QoS (quality of service) requirement.

In step 350, radio resources are allocated in accordance with the calculated average values, and in step 360, an indication of the allocation is transmitted to each of the relays.

Various border conditions may be used in one or more of the steps 320, 330 and 340. For example, the total amount of radio resources available for each relay link (access and backhaul) may be taken into account, as well as, or alternatively to, the total amount of radio resources available for the relay backhaul links and the base station access link together.

The method 300 may, for example, be carried out in a scheduler, in a base station, and/or in a base station controller of a wireless communication network.

Figure 4A:
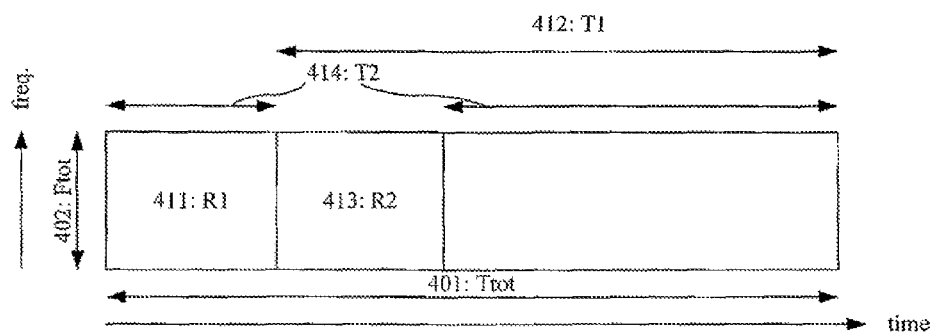
FIGS. 4A-C are schematic drawings illustrating resource allocation in time and/or frequency according to some embodiments of the invention.
Figure 4B:
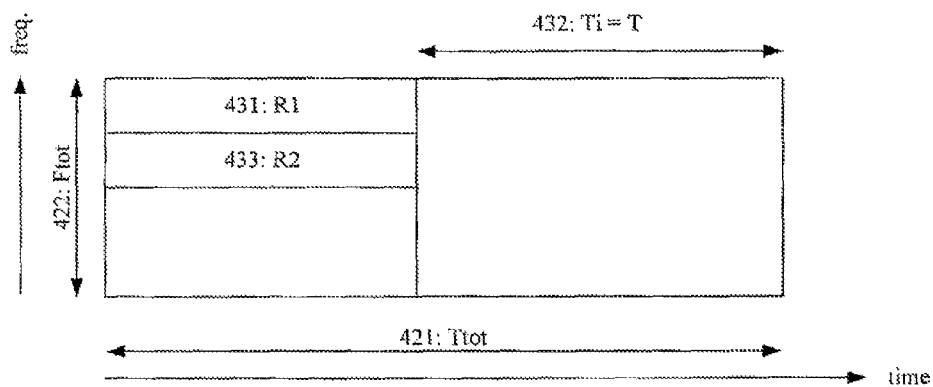
Figure 4C:
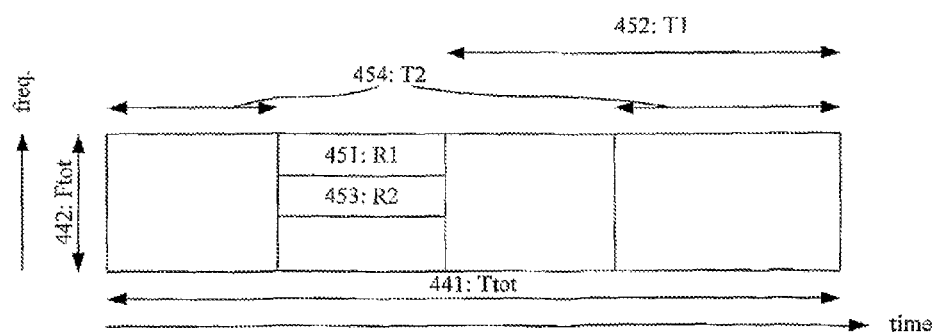

Embodiments of the invention will now be described in the context of downlink resource allocation in an example system comprising one eNodeB and a particular number of relays. FIGS. 4A-C illustrates scenarios with three relays and some of the following formulas will be given for two relays. It is emphasized that these embodiments are merely illustrative examples and are by no means meant as limiting for the invention.

The following definitions will be used for the description of the example embodiments:

$T_{tot}$: The total available time resources. Known parameter. [s]

$F_{tot}$: The total available frequency resources. Known parameter. [Hz]

$T_i$: length of normal sub-frames for relay access link transmission of relay i. To be determined, relates to $R_i$. [s]

$R_i$: amount of radio resources for relay backhaul link transmission of relay i. To be determined, relates to $T_i$. [s Hz]

$R_{eNodeB}$: amount of radio resources for eNodeB access link transmission. To be determined. [s Hz]

$rs_{eNB}$: average spectrum efficiency of eNodeB access link over the period in which the eNodeB access link is scheduled. Known parameter, signalled (compare with step 310 of FIG. 3). [bps/Hz]

$rs_{b-i}$: average spectrum efficiency of relay backhaul link of relay i over the period in which the relay backhaul link of relay i is scheduled. Known parameter, signalled (compare with step 310 of FIG. 3). [bps/Hz]

$r_{a-i}$: average throughput of relay access link of relay i over the period in which the relay access l link of relay i is scheduled. Known parameter, signalled (compare with step 310 of FIG. 3). [bps]

$n_{eNB}$: average number of users served by eNodeB cell. Known parameter, signalled (compare with step 310 of FIG. 3).

$n_{r-i}$: average number of users served by relay cell i. Known para signalled (compare with step 310 of FIG. 3).

The average backhaul throughput for relay i: $rs_{b-i}R_i/T_{tot}$. [bits/s]

The average access throughput for relay i: $r_{a-i}T_i/T_{tot}$. [bit/s]

The average base station cell throughput (eNodeB access link): $r_{eNB}=R_{eNodeB}rs_{eNB}/T_{tot}=(T_{tot}F_{tot}-\Sigma_i R_i)rs_{eNB}/T_{tot}$. [bits/s]

The average cell throughput of relay i (minimum of access and backhaul throughput): $r_{relay-i}=\min(rs_{b-i}R_i; r_{3-i}T_i)/T_{tot}$ It is noted that the average spectrum efficiency and throughput depend from both link quality and data characteristic.

Now, various examples of determination of a resource allocation for each relay backhaul link by performance (e.g. throughput) matching between relay access link and corresponding relay backhaul link will be given (compare with step 320 of FIG. 3). Thus, $$rs_{b-i}R_i = r_{a-i}T_i \qquad (1)$$

This corresponds to allocation of radio resources to the relay backhaul link of:

$$R_i = (r_{a-i}T_i)/rs_{b-i} \qquad (2)$$

Moreover, the following two constraints may be put on $R_i$:

That, for each relay, the total amount of radio resources used by the relay backhaul link and the relay access link cannot exceed the total available radio resources, i.e.

$$R_i + T_i F_{tot} \leq T_{tot} F_{tot} \quad (3)$$

That the total amount of radio resources used by the relay backhaul links of all of the relays served by the same eNodeB cannot exceed the total available radio resources, i.e.

$$\sum_i R_i \leq T_{tot} F_{tot}. \quad (4)$$

FIG. 4A illustrates an example of determination of a resource allocation for each relay backhaul link by throughput matching between relay access link and corresponding relay backhaul link. In FIG. 4A, the relay backhaul links are time multiplexed within the backhaul time interval. In this example, a first radio resource amount 411 is allocated to the backhaul link of the first relay, and a second radio resource amount 413 is allocated to the backhaul link of the second relay. As mentioned before, the relay access links are preferably time multiplexed with their corresponding relay backhaul links. Thus, the access link of the first relay should not use the same time interval as the first radio resource amount 411 and the access link of the second relay should not use the same time interval as the second radio resource amount 413. In this example, the access link of the first relay occupies the time interval 412 and the access link of the second relay occupies the time intervals 414. $T_{tot}$ is indicated by 401 and $F_{tot}$ is indicated by 402.

Considering that the average cell throughput of a relay is limited by the minimum of the relay access throughput and the relay backhaul throughput, and considering that allocating more radio resources to one of the relay backhaul link and the relay access link implies allocating less radio resources to the other link, it may be concluded that a relay achieves its maximum throughput when the relay backhaul link and the relay access link match with each other (see equation (1)) and when the relay backhaul link and the relay access link use all the available radio resources, i.e.

$$R_i + T_i F_{tot} = T_{tot} F_{tot} \quad (5)$$

This yields $R_i = (T_{tot} - T_i) F_{tot}$, which implies that the backhaul link of relay i will occupy all the available bandwidth in the respective backhaul sub-frames. If there is more than one relay, the backhaul sub-frames for these relays can only be time multiplexed.

Solving (1) and (5) for $R_i$ and $T_i$ provides the following optimal $R_i$ and $T_i$ for time multiplexed backhaul sub-frames:

$$R_i = \frac{r_{a-i}}{r_{a-i} + F_{tot} rs_{b-i}} (F_{tot} T_{tot}) \quad (6)$$

$$T_i = \frac{F_{tot} rs_{b-i}}{r_{a-i} + F_{tot} rs_{b-i}} T_{tot}. \quad (7)$$

If the eNodeB only serves one relay it is always possible to allocate the radio resources for this relay as shown in equations (6) and (7) since, obviously, $R_i < F_{tot} T_{tot}$, and $T_i < T_{tot}$. However, if more than one relays are served by the eNodeB, the optimal allocation of equations (6) and (7) cannot be supported if the sum of the desired radio resources of all the relay backhaul links exceeds the total available radio resources (compare with equation (4)), i.e. if $$\sum_i \frac{r_{a-i}}{r_{a-i} + F_{tot} rs_{b-i}} (F_{tot} T_{tot}) > F_{tot} T_{tot}. \quad (8)$$

FIG. 4B illustrates an example of determination of a resource allocation for each relay backhaul link by throughput matching between relay access link and corresponding relay backhaul link. In FIG. 4B, the relay backhaul links are frequency multiplexed within the backhaul time interval. In this example, a first radio resource amount 431 is allocated to the backhaul link of the first relay, and a second radio resource amount 433 is allocated to the backhaul link of the second relay. As mentioned before, the relay access links are preferably time multiplexed with their corresponding relay backhaul links. Thus, the access links of the relays should not use the same time interval as the radio resource amounts 431 and 433. In this example, the access links of the relays occupy the time interval 432 which corresponds to the access time interval. $T_{tot}$ is indicated by 421 and $F_{tot}$ is indicated by 422.

Again, it may be concluded that a maximum throughput is achieved when all the available radio resources are used (compare with (5)). In the case of frequency multiplexed relay backhaul links, the length of the sub-frames ($T_i$) is typically the same for the different relays. Thus, we have:

$$\sum_i \frac{R_i}{T_{tot} - T_i} = \sum_i \frac{R_i}{T_{tot} - T} \leq F_{tot}, \quad (9)$$

where equality corresponds to use of all the available radio resources. This yields that:

$$T \leq \frac{F_{tot}}{F_{tot} + \sum_i r_{a-i}/rs_{b-i}} T_{tot}. \quad (10)$$

Equations (2) and (10) give, for the case of two relays, that:

$$\sum_i R_i < \frac{r_{a-1} rs_{b-2} + r_{a-2} rs_{b-1}}{r_{a-1} rs_{b-2} + r_{a-2} rs_{b-1} + F_{tot} rs_{b-1} rs_{b-2}} F_{tot} T_{tot}. \quad (11)$$

Assuming maximum T (i.e. equality in (10), which corresponds to use of all the available radio resources) and using equation (1), we get:

$$R_i = \frac{r_{a-i}/rs_{b-i}}{F_{tot} + \sum_i r_{a-i}/rs_{b-i}} (F_{tot} T_{tot}). \quad (12)$$

Obviously, $$\sum_i R_i < F_{tot} T_{tot},$$

which implies that (in principle) it is always possible to allocate resources according to equation (12) for frequency multiplexed relay backhaul links, regardless of the number of relays that an eNodeB serves.

It could also be noted that, for each relay, the radio resources allocated to the backhaul link for the frequency multiplexing option (equation (12)) are less than the radio resources allocated to the backhaul link for the time multiplexing option (equation (6)).

In general, multiplexing the backhaul sub-frames in both time domain and frequency domain provides a more flexible scheme than each of the time multiplexed and the frequency multiplexed cases. The radio resource allocation to a relay backhaul link for the time and frequency multiplexed ease will typically fall in between that of pure time multiplexing and that of pure frequency multiplexing.

FIG. 4C illustrates an example of determination of a resource allocation for each relay backhaul link by throughput matching between relay access link and corresponding relay backhaul link. In FIG. 4C, the relay backhaul links are time and frequency multiplexed. In this example, a first radio resource amount 451 is allocated to the backhaul link of the first relay, and a second radio resource amount 453 is allocated to the backhaul link of the second relay. As mentioned before, the relay access links are preferably time multiplexed with their corresponding relay backhaul links. Thus, the access link of the first relay should not use the same time interval as the first radio resource amount 451 and the access link of the second relay should not use the same time interval as the second radio resource amount 453. In this example, the access link of the first relay occupies the time interval 452 and the access link, of the second relay occupies the time intervals 454. $T_{tot}$ is indicated by 441 and $F_{tot}$ is indicated by 442.

Assuming, for relay i, that $k_i$ percent of the radio resources allocated to its backhaul link (i.e. $R_i$) are time multiplexed with radio resources allocated to the other relay backhaul links (and/or the eNodeB access link), while the rest is frequency multiplexed, one possible determination criteria may be (compare with (5) and (9));

$$R_i k_i + \sum_j R_j(1 - k_j) \le (T_{tot} - T_i)F_{tot}. \tag{13}$$

If the frequency multiplexed part occupies all the available frequency resources, the equality of equation (13) holds for all of the relays. Similarly to the pure time multiplexed case and the pure frequency multiplexed case, the optimal $R_i$ can be found by solving (13) and (1).

When the first hypothetical allocation of radio resources to each relay backhaul link have been determined. (see equations (6), (12) and (13)) and corresponding determination of sub-frame length for relay access links ($T_i$) have been made, embodiments of the invention turn to performance balancing of terminals served by the various relays and directly by the base station. Thus, embodiments of the invention determine a relation between a resource allocation for each relay backhaul link and a resource allocation for the base station access link (compare with step 330 of FIG. 3).

In some embodiments of the invention, maximization of system throughput is also taken into account. The (average) system throughput for a donor cell with relays is $$r = r_{eNB} + \sum_i r_{relay-i}. \tag{14}$$

If $r_{relay-i}$ is limited by the relay access link, increasing $R_i$ will decrease both $r_{eNB}$ and $r_{relay-i}$. Therefore, the maximum (average) system throughput is typically achieved when $r_{relay-i}$ is limited by the relay backhaul link. Thus, (14) may be written as:

$$r = \left(T_{tot}F_{tot} - \sum_i R_i\right)rs_{eNB} + \sum_i R_i rs_{b-i} = \tag{15}$$
$$T_{tot}F_{tot}rs_{eNB} + \sum_i (rs_{b-i} - rs_{eNB})R_i.$$

A study of equation (15) indicates that (to optimize system throughput), the radio resources allocated to the backhaul link of relay i should be maximized if $rs_{b-i} > rs_{eNB}$ (while keeping the balance of the relay backhaul, link and the relay access link). On the other hand, if $rs_{b-i} < rs_{eNB}$, the radio resources allocated to the backhaul link of relay i should be minimized.

In the described algorithms of embodiments of the invention, it is assumed that the relays are properly deployed so that $rs_{b-i} > rs_{eNB}$. This is also a reasonable assumption in real applications. Thus, to maximize the average system throughput in such a situation, it may be advisable to balance the relay backhaul link and corresponding relay access link and to allocate as much resources as possible to the relay backhaul links.

Furthermore, the above analysis also shows that having the relay backhaul link as the limiting link for a relay may typically be beneficial for the system throughput. Therefore, in the described algorithm of some embodiments of the invention, a balance is first found for the two links of each relay. Then, the derived resource allocation for the relay access links is kept unaltered and only the resources fir the relay backhaul links are reduced (if needed to achieve user performance balance). In this way, the relay backhaul link becomes the limiting link.

If $rs_{b-i} < rs_{eNB}$, it may in principal be more beneficial to allocate resources based on a comparison of the (average) spectrum efficiency of the relay backhaul link and the (average) spectrum efficiency of the eNodeB access link for a terminal associated with the relay.

As a note, it should not be very likely (with proper relay deployment) that the (average) relay backhaul link quality is worse than the (average) eNodeB access link quality.

Assuming that the relay performance is limited by the backhaul link, balancing of the (average) throughput performance of relay users and eNodeB users corresponds to:

$$\frac{R_1 rs_{b-1}}{n_{r-i}} = \frac{R_2 rs_{b-2}}{n_{r-2}} = \ldots = \frac{R_{eNB} rs_{eNB}}{n_{eNB}} \tag{16}$$

Using equation (4), equation (16) may be solved to achieve corresponding optimal $R_i$:s (second hypothetical allocation of radio resources to each relay backhaul link, which may or may not differ from the $R_i$:s achieved by equations (6), (12) and (13)).

Finally, some embodiments of the invention may determine a trade-off between the first and second hypothetical allocations. For example a weighted average may be applied (compare with step 340 of FIG. 3). One or more border conditions (e.g. equations (3) and/or (4)) may also be considered in this step.

As a further note, the optimal balanced performance between users of relays and direct users of base station is not always possible to achieve. For instance, if the average eNodeB user performance is better than the average relay user performance and the relay has reached its maximum throughput (which implies that the relay backhaul link is matched to the relay access link), the user performance balance can not be improved even with a further increase of the resources for the relay backhaul link.

Such a situation may be taken as an indication to trigger other means to improve the performance, e.g. one or more of:
Load balancing via e.g. cell selection and handover.
Increasing the relay backhaul and/or the relay access capability by introducing more advanced transmitter/receiver algorithms, e.g. MIMO.
Adding CoMP (Coordinated Multi Point transmission/reception) functionality for relays and/or eNodeB. Then, relays and/or eNodeB may perform RRM coordinately.
Deploying more relays.
Adopting out-band relay backhaul or fixed connection for the relay backhaul transmission.

A more detailed embodiment of the invention will now be described where the more general teachings above are applied.
1. Each relay sends the status of its backhaul link and access link to the serving eNodeB (compare with step 310 of FIG. 3). The status can be reported either periodically or event triggered. The status information may, for example, include one or more of:
the (average) throughput and/or the (average) spectrum efficiency,
traffic type (or QoS requirement),
the relay buffer status,
the number of served users.
2. The eNodeB determines two sets of optimal radio resource allocations for each served relay's backhaul link (compare with steps 320 and 330 of FIG. 3, and with equations (6), (12), (13) and (16)).
A. Maximization of average system throughput (which implies that relay backhaul link and relay access link should be balanced (compare with step 320 of FIG. 3) lithe relay is properly deployed):
First, for each relay, the optimal radio resource allocation is determined for its backhaul link (denoted $Rsys_i^k$) so that the relay backhaul link and the relay access link are balanced, while it is assumed that k % of the radio resources allocated to each relay backhaul link is time multiplexed while the rest is frequency multiplexed (compare with equation 13)).
The optimal length of normal sub-frames (denoted $Tsys_i^k$) for each relay may also be determined (compare with equation (1)).
The optimal number of normal sub-frames $Nsys_i^k$ could, for example, be set to $\lfloor N_{sub-frame} Tsys_i^k / T_{frame} \rfloor$, where $T_{frame}$ is the length of a frame and $N_{sub-frame}$ is the number of sub-frames in a frame.
Then, the maximum k that can be supported according to the constraints defined by formula (3) and formula (4) is determined.
The optimal $Rsys_i^k$, $Tsys_i^k$ and $Nsys_i^k$ corresponding to the maximum k are denoted $Rsys_i^{kmax}$, $Tsys_i^{kmax}$ and $Nsys_i^{kmax}$.

B. Balancing of average relay user performance and eNodeB user performance (compare with step 330 of FIG. 3):
First, for each relay, the optimal radio resource allocation is determined for its backhaul link (denoted $Ruser_i$) according to formula (16).
The length (or the number) of normal sub-frames is set to the same value as that determined in the previous step (i.e. $Tsys_i^{kmax}$ (or $Nsys_i^{kmax}$)).
Then, for each relay, if the optimal allocation for the backhaul link, cannot be supported, i.e. if $Ruser_i > Rsys_i^{kmax}$, set the optimal allocation to the allocation that maximizes the average system throughput, i.e. set $Ruser_i = Rsys_i^{kmax}$.
(Optionally, such a situation may be used as a criterion to trigger other methods to further improve the system performance as elaborated on above.)
3. For each relay, the final optimal radio resource allocation for its backhaul link is determined as a weighted, sum of $Rsys_i^{kmax}$ and $Ruser_i$:

$$R_i^{optional} = mRsys_i^{kmax} + (1-m)Ruser_i$$

The parameter m may be a configurable system parameter, mid it may optionally be set different for different relays. The parameter m provides a possibility to exercise a trade off between capacity and balance of user performance. In some embodiments, it is set depending on e.g. a QoS requirement (which may be different for different users served by different relays).
The optimal length (or the number) of normal sub-frames may be set to $Tsys_i^{kmax}$ (or $Nsys_i^{kmax}$). Correspondingly, the optimal length (or the number) of backhaul sub-frames is $T_{tot} - Tsys_i^{kmax}$ (or $N_{frame} - Nsys_i^{kmax}$).
4. If $R_i^{optional} < Rsys_i^{kmax}$, the relay can mute transmissions of part of the radio resources allocated to its access link.

Embodiments of the invention have now been described in the context of downlink transmission. It is notable that the optimal radio resource allocation may differ between the uplink and the downlink. The example schemes given above for downlink may he separately applied for either or both of uplink and downlink optimization.

It is also worth noting that, although the above examples have involved two or more relays associated with the network node of a donor cell, embodiments are equally applicable when only one relay is associated with a base station. In such a scenario, the above schemes may he used to balance resources between the relay links and the base station access link, and also between the relay access link and the relay backhaul link.

Figure 5:
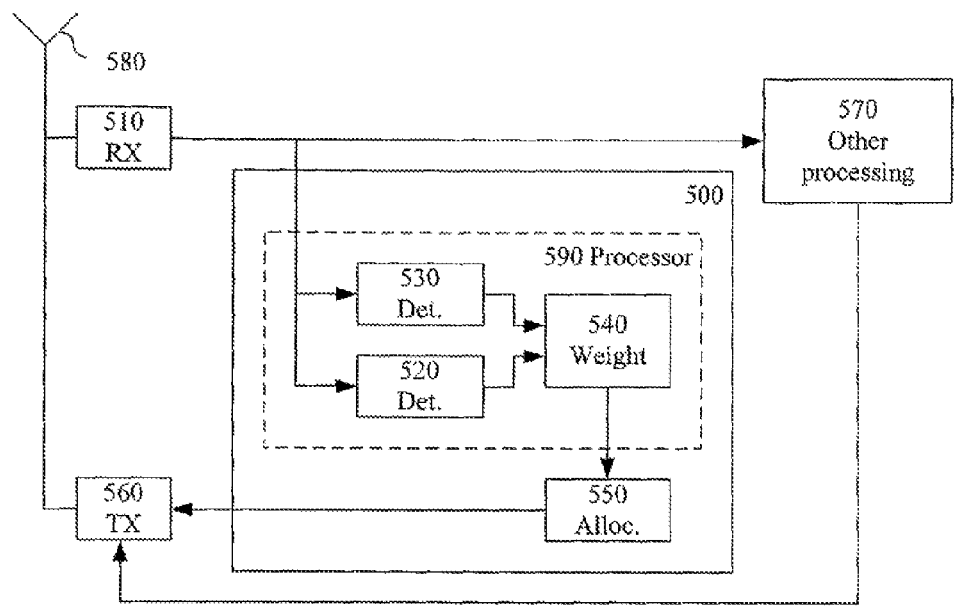
FIG. 5 is a block diagram illustrating an example arrangement according to some embodiments of the invention.

FIG. 5 is a block diagram of an example arrangement according to some embodiments of the invention. The example arrangement of FIG. 5 may for example, be adapted to carry out one or more of the method steps as described in connection to FIG. 3, and/or any of the other method steps elaborated on above.

The arrangement comprises one or more antennas 580 connected to a receiver 510 and a transmitter 560.

The receiver is adapted to receive status indications (compare with step 310 of FIG. 3) from one or more relays. The receiver 510 may also be adapted to receive other information, which may be forwarded to other processing units 570.

The status indications are forwarded to a scheduler 500, which is adapted to use the status indications to allocate radio resources to links of the one or more relays. The scheduler 500 comprises a processor 590 and an allocator 550. The processor 590, in turn, comprises two determination units 520 and 530 and a weighting unit 540.

The determination unit 520 may be adapted to determine a first resource allocation based on balancing of performance of the relay access and backhaul links (compare with step 320 of FIG. 3).

The determination unit 530 may be adapted to determine a second resource allocation based on balancing of user performance of the relay links and the base station link (compare with step 330 of FIG. 3).

The weighting unit 540 may be adapted to calculate a weighted average value of the first and second resource allocations (compare with step 340 of FIG. 3).

The allocator 550 may be adapted to allocate resources based on the calculated weighted average values.

The transmitter 560 is adapted to transmit indications regarding the resources allocated by the scheduler 500 to one or more relays (compare with step 360 of FIG. 3). The transmitter 560 may also be adapted to transmit other information, which may be supplied by other processing units 570.

The antennas 580, the receiver 510 and the transmitter 560 are typically locates at a base station site and the receiver 510 and the transmitter 560 are typically comprised in a base station (e.g. eNodeB). In some embodiments, however, the receiver 510 and the transmitter 560 may be comprised in a network controller or similar network node. The scheduler 500 may be comprised in either a base station or a network controller or similar network node. If the scheduler 500 is comprised in a network controller or similar network node, there should also be a transfer of information regarding the status of the base station access link to the scheduler 500. Such status indications may, for example, comprise information regarding the number of terminals served and information regarding the spectrum efficiency of the base station access link. If the scheduler 500 is comprised in a base station, such status indications are typically already available within the base station.

The described embodiments of the invention and their equivalents may be realised in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a base station (NodeB, eNodeB), a relay or a network controller.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a base station or network controller. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in FIG. 3.

Figure 6:
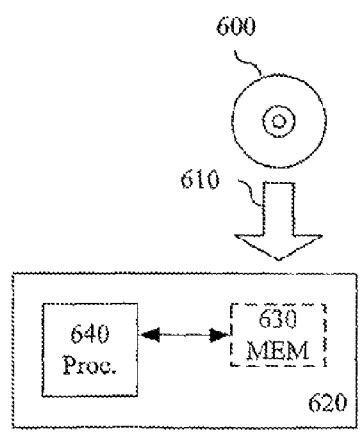
FIG. 6 is a schematic drawing illustrating a computer readable medium according to some embodiments of the invention.

FIG. 6 is a schematic drawing illustrating such a computer readable medium in the form of a CD-ROM 600. The CD-ROM 600 may have stored thereon a computer program comprising program instructions. The computer program may be loadable (as shown by arrow 610) into an electronic device 620 comprising a processing unit 640 and possibly a separate memory unit 630. When loaded into the electronic device 620, the computer program may be stored in the memory unit 630. According to some embodiments, the computer program may, when loaded into the electronic device 620 and run by the processing unit 640, cause the electronic device 620 to execute method steps according to, for example, any of the methods described above.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method of allocating radio resources of a wireless communication system having a network node, a relay associated with the network node, and a terminal accessing the communication system via respective communication links including a terminal-to-network-node communication link, a terminal-to-relay communication link of the relay and a relay-to-network-node communication link, the method comprising:

receiving status parameters of each of the communication links;

determining from the status parameters, a performance of the terminal-to-network-node communication link, the terminal-to-relay communication link and the relay-to-network-node communication link;

determining a first radio resource allocation by balancing the performance of the relay-to-network-node communication link with a performance of the terminal-to-relay communication link;

determining a second radio resource allocation by balancing the performance of the rely-to-network-node communication link with a performance of the terminal-to-network-node communication link;

calculating an average of the first and second radio resource allocations; and allocating radio resources to the terminal-to-network-node communication link, the terminal-to-relay communication link, and the relay-to-network-node communication link based on the average of the first and second radio resource allocations;

wherein when the radio resources of the relay-to-network-node communication link comprise time-frequency blocks having a corresponding time-frequency block size for the relay, the method further comprises:

receiving the status parameters from the relay, the status parameters comprising at least information regarding a number of terminals served by the relay, information regarding a throughput of the terminal-to-relay communication link, information regarding at least one of a traffic type and a quality of service requirement of the terminal served by the relay and information regarding a spectrum efficiency of the relay-to-network-node communication link;

determining for the relay, a first time-frequency block size based at least on the information regarding the throughput of the terminal-to-relay communication link and the spectrum efficiency of the relay-to-network-node communication link;

determining for the relay, a second time-frequency block size based at least on the number of terminals served by the relay, a number of terminals served by the network node, the spectrum efficiency of the relay-to-network-node communication link of the relay, and a spectrum efficiency of a terminal-to-network-node communication link;

calculating a weighted average value of the first and second time-frequency block sizes for the relay based at least on the information regarding the traffic type and the quality of service requirement of the terminal served by the relay;

allocating radio resources to the relay-to-network-node communication link of the relay in accordance with the corresponding calculated weighted average value; and transmitting an indication of the corresponding allocated radio resources to the relay.

2. The method of claim 1, wherein calculating an average of the first and second radio resource allocations includes:

calculating a weighted average of the first and second radio resource allocation, wherein the weights of the first and second radio resource allocation are based on system throughput and a quality of service requirement (QoS) of the terminal served by the relay; and allocating radio resources in accordance with the corresponding calculated weighted average.

3. The method of claim 1, wherein the performances are defined as an amount of data per time and frequency unit.

4. The method of claim 1, further comprising:

receiving from the network node, a status parameter comprising at least information regarding the number of terminals served by the network node, and information regarding the spectrum efficiency of the terminal-to-network-node communication link.

5. The method of claim 4, wherein the step of calculating the weighted average value comprises:

minimizing the time frequency block size for the relay-to-network-node communication link when the average spectrum efficiency of the relay-to-network-node communication link is less than the average spectrum efficiency of the terminal-to-network-node communication link; and maximizing the time-frequency block size for the relay-to-network-node communication link when the average spectrum efficiency of the relay-to-network-node communication link is greater than or equal to the average spectrum efficiency of the terminal-to-network-node communication link.

6. The method of claim 1, wherein the wireless communication system operates in compliance with the telecommunication standard Evolved Universal Terrestrial Radio Access Network (E-UTRAN), the network node is an eNodeB, and the relay is a type one relay.

7. A computer program product in a wireless communication system having a network node, a relay associated with the network node, and communication links including a terminal-to-network-node communication link, a terminal-to-relay link of the relay, and a relay-to-network-node communication link, the computer program product comprising a non-transitory computer readable medium having stored thereon, a computer program comprising program instructions, the computer program being loadable into a data-processing unit of the wireless communication system, wherein when the computer program is run by the data-processing unit, the program instructions cause the data-processing unit to:

receive status parameters of each of the communication links;

determine from the status parameters, a performance of the terminal-to-network-node communication link, the terminal-to-relay communication link, and the relay-to-network-node communication link;

determine a first radio resource allocation by balancing the performance of the relay-to-network-node communication link with a performance of the terminal-to-relay communication link;

determine a second radio resource allocation by balancing the performance of the relay-to-network-node communication link with a performance of the terminal-to-network-node communication link;

calculate a weighted average of the first and second radio resource allocations; and allocate radio resources to the terminal-to-network-node communication link, the terminal-to-relay communication link, and the relay-to-network-node communication link based on the average of the first and second radio resource allocations;

wherein when the radio resources of the relay-to-network-node communication link comprise time-frequency blocks having a time-frequency block size for the relay, the program instructions further cause the data-processing unit to:

determine for the relay, a first time-frequency block size based at least on information regarding a throughput of the corresponding terminal-to-relay communication link and information regarding a spectrum efficiency of the relay-to-network-node communication link;

determine for the relay, a second time-frequency block size based at least on information regarding a number of terminals served by the relay, information regarding a number of terminals served by the network node, the information regarding the spectrum efficiency of the relay-to-network-node communication link, and information regarding a spectrum efficiency of the terminal-to-network-node communication link;

calculate a weighted average value of the first and second time-frequency block sizes for the relay based on information regarding at least one of a traffic type and a quality of service requirement of the terminals served by the relay; and allocate radio resources to the relay-to-network-node communication link of the relay in accordance with the calculated weighted average value.

8. An arrangement for allocating radio resources of a wireless communication system, wherein the wireless communication system comprises a network node, a relay associated with the network node, and a terminal for accessing the wireless communication system via respective communication links including a terminal-to-network-node communication link, a terminal-to-relay communication link, and a relay-to-network-node communication link, the arrangement comprising:

a processor and associated circuitry to:
receive status parameters of each of the communication links;
determine from the status parameters, a performance of the terminal-to-network-node communication link, the terminal-to-relay communication link, and the relay-to-network-node communication link;
determine a first radio resource allocation by balancing the performance of the relay-to-network-node communication link with the performance of the terminal-to-relay communication link;
determine a second radio resource allocation by balancing the performance of the relay-to-network-node communication link with a performance of the terminal-to-network-node communication link; and
calculate an average of the first and second radio resource allocations; and an allocator configured to allocate radio resources to the terminal-to-network-node communication link, the terminal-to-relay communication link, and the relay-to-network-node communication link based on the average of the first and second radio resource allocations;

wherein when the radio resources of the relay-to-network-node communication link comprise time-frequency blocks having a time-frequency block size for the relay, the processor is further configured to:
determine, for the relay, a first time-frequency block size based at least on information regarding a throughput of the corresponding terminal-to-relay communication link and information regarding a spectrum efficiency of the relay-to-network-node communication link;
determine, for the relay, a second time-frequency block size based at least on information regarding a number of terminals served by the relay, information regarding a number of terminals served by the network node, the information regarding the spectrum efficiency of the relay-to-network-node communication link, and information regarding a spectrum efficiency of the terminal-to-network-node communication link; and calculate a weighted average value of the first and second time-frequency block sizes for the relay based on information regarding at least one of a traffic type and a quality of service requirement of the terminals served by the relay; and
wherein the allocator is configured to allocate radio resources to the rely-to-network-node communication link of the relay in accordance with the calculated weighted average value.

9. The arrangement of claim 8, wherein the processor comprises circuitry configured to calculate a weighted average value of the first and second radio resource allocation based on system throughput and a quality of service requirement (QoS) of the terminal served by the relay.

10. The arrangement of claim 8, further comprising:
a receiver configured to receive status parameters from the relay, wherein the status parameters comprise at least the information regarding the number of terminals served by the relay, the information regarding the throughput of the terminal-to-relay communication link, the information regarding at least one of the traffic type and the quality of service requirement of the terminals served by the relay, and the information regarding the spectrum efficiency of the relay-to-network-node communication link; and
a transmitter configured to transmit an indication of the allocated radio resources to the relay.

11. The arrangement of claim 10, wherein the processor is configured to calculate the weighted average values of the first and second time-frequency block sizes by:
minimizing the time-frequency block size for the relay-to-network-node communication link when the average spectrum efficiency of the relay-to-network-node communication link is less than the average spectrum efficiency of the terminal-to-network-node communication link; and
maximizing the time-frequency block size for the relay-to-network-node communication link when the average spectrum efficiency of the relay-to-network-node communication link is greater than or equal to the average spectrum efficiency of the terminal-to-network-node communication link.

12. The arrangement of claim 8, wherein the wireless communication system and the scheduler operate in compliance with the telecommunication standard Evolved Universal Terrestrial Radio Access Network (E-UTRAN), the network node is an eNodeB, and the relay is a type one relay.

13. The arrangement of claim 12, wherein the arrangement is implemented in a scheduler in the eNodeB.

* * * * *